(12) United States Patent
Nishiura et al.

(10) Patent No.: US 11,596,197 B2
(45) Date of Patent: *Mar. 7, 2023

(54) OUTSOLE AND SHOE (71) Applicant: ASICS Corporation, Kobe (JP)

(72) Inventors: Yusuke Nishiura, Kobe (JP); Junichiro Tateishi, Kobe (JP)

(73) Assignee: ASICS CORPORATION, Kobe (JP)

( * ) Notice: Subject to any disclaimer, the term of this patent is extended or adjusted under 35 U.S.C. 154(b) by 84 days.

This patent is subject to a terminal disclaimer.

(21) Appl. No.: 16/874,544

(22) Filed: May 14, 2020

(65) Prior Publication Data

US 2020/0281309 A1 Sep. 10, 2020

Related U.S. Application Data (63) Continuation of application No. PCT/JP2017/043331, filed on Dec. 1, 2017.

(51) Int. Cl.
| | | |
|---|---|---|
| *A43B 13/04* | (2006.01) | |
| *B32B 5/04* | (2006.01) | |
| *B32B 3/26* | (2006.01) | |
| *B32B 3/30* | (2006.01) | |
| *B32B 3/12* | (2006.01) | |
| *B32B 5/02* | (2006.01) | |

(52) U.S. Cl.
CPC .............. *A43B 13/04* (2013.01); *B32B 3/12* (2013.01); *B32B 3/266* (2013.01); *B32B 3/30* (2013.01); *B32B 5/02* (2013.01); *B32B 5/04* (2013.01); *B32B 2307/51* (2013.01); *B32B 2307/70* (2013.01); *B32B 2437/02* (2013.01); *Y10T 428/24273* (2015.01); *Y10T 428/24331* (2015.01)

(58) Field of Classification Search
CPC ...................................................... A43B 13/04
See application file for complete search history.

(56) References Cited

U.S. PATENT DOCUMENTS

| | | | | |
|---|---|---|---|---|
| 5,930,917 A | * | 8/1999 | Pavelescu | A43B 7/125 36/12 |
| 6,032,388 A | | 3/2000 | Fram | |
| 6,521,164 B1 | * | 2/2003 | Plummer | B29C 45/0001 264/328.17 |
| 2010/0154253 A1 | | 6/2010 | Imazato et al. | |

(Continued)

FOREIGN PATENT DOCUMENTS

| | | |
|---|---|---|
| JP | S63-77943 A | 4/1988 |
| JP | H03-106304 A | 5/1991 |

(Continued)

OTHER PUBLICATIONS

International Search Report issued in PCT/JP2017/043331; dated Feb. 27, 2018.

(Continued)

*Primary Examiner* — William P Watkins, III (74) *Attorney, Agent, or Firm* — Studebaker & Brackett PC (57) ABSTRACT

Provided in the present disclosure is an outsole including a sheet body which includes a substrate sheet and an injection molded article fixed to the substrate sheet, and a shoe that has the injection molded article having a certain melt viscosity and thereby being excellent in grip performance and long-term durability.

11 Claims, 8 Drawing Sheets

(56) References Cited

U.S. PATENT DOCUMENTS

2012/0041141 A1* 2/2012 Otomo .............. C08G 18/6651
  524/588
2018/0271210 A1   9/2018 Tanaka et al.
2019/0335850 A1* 11/2019 Nishiura ............. A43B 13/181

FOREIGN PATENT DOCUMENTS

| JP | H08-48871 A | 2/1996 |
|----|----|----|
| JP | 2001-510389 A | 7/2001 |
| JP | 2015-021050 A | 2/2015 |
| WO | 2008/146342 A1 | 12/2008 |
| WO | 2017/046936 A1 | 3/2017 |

OTHER PUBLICATIONS

Notification of Transmittal of Translation of the International Preliminary Report on Patentability (Chapter I) and Translation of Written Opinion of the International Searching Authority, PCT/JP2017/043331 dated Jun. 2, 2020.

* cited by examiner

FIG. 8

OUTSOLE AND SHOE

CROSS REFERENCE TO RELATED APPLICATIONS

This is a Continuation Application of PCT Application No. PCT/JP2017/043331, filed Dec. 1, 2017.

FIELD

The present disclosure relates to an outsole and a shoe including the outsole.

BACKGROUND

Shoes such as sports shoes conventionally are made up of many members. For example, a sole is composed of members such as an inner sole, a sock liner, a midsole and an outsole. Shoes are required to have functions of not only giving comfortable wearing feeling to the wearer, but also supporting the wearer's motion, such as running and stopping. Therefore, shoes being excellent in functionality, such as grip performance are required so far. A sport shoe has a ground engaging surface that is provided with a tread formed with a plurality of protrusions in order to provide excellent grip performance. In this regard, for example, in Patent Document 1, it is described that an injection molding called a tread element is integrated with a substrate sheet by injection molding. In this regard, for example, Patent Literature 1 below describes that injection molded articles called tread elements are integrated with a substrate sheet by injection molding. JP 2001-510389 T also describes that the outsole is made of a sheet body formed by integrating the substrate sheet with the injection molded articles.

SUMMARY

Since the tread of the conventional outsole as disclosed in the aforementioned patent literature is made up of individual elements, the elements may fall off from the substrate sheet when, for example, excessive force is applied to the shoe sole.

In view of this, the present disclosure provides an outsole including an injection molded article which hardly falls off from a substrate sheet, and hence to provide a shoe excellent in grip performance and durability.

The following presents a simplified summary of the disclosure disclosed herein in order to provide a basic understanding of some aspects of the disclosure. This summary is not an extensive overview of the disclosure. It is intended to neither identify key or critical elements of the disclosure nor delineate the scope of the disclosure. Its sole purpose is to present some concepts of the disclosure in a simplified form as a prelude to the more detailed description that is presented later.

In order to solve the problem, according to the present disclosure, there is provided an outsole having at least one sheet body: the at least one sheet body comprising a substrate sheet and an injection molded article that is obtained by injection molding of a resin composition, the injection molded article being fixed to the substrate sheet by injection molding, the resin composition comprising a thermoplastic resin, and the resin composition having, when a thermal melting temperature is set to T(° C.), a melt viscosity ($\eta_{100}$) at a shear rate of at least 100 (sec$^{-1}$) in at least part of a temperature range of (T+0° C.) to (T+50° C.) satisfying formula (1) below $$\eta_{100} \leq 900 \text{ Pa·s} \tag{1}$$

Further, the present disclosure provides a shoe including the aforementioned outsole in order to solve the above problem.

BRIEF DESCRIPTION OF DRAWINGS

The foregoing and other features of the present disclosure will become apparent from the following description and drawings of an illustrative embodiment of the disclosure in which.

DESCRIPTION OF EMBODIMENTS

Since the tread of the conventional outsole as disclosed in JP 2001-510389 T is made up of individual elements, the elements may fall off from the substrate sheet when, for example, excessive force is applied to the shoe sole.

In order to solve the aforementioned problem, it is conceivable to form an injection molded article that includes connecting members each connecting adjacent ones of the elements through their portions close to the substrate sheet at the time of injection molding, instead of forming individual elements. Giving an explanation on this regard, the injection molded article provided with the connecting members can have a large adhesion area to the substrate sheet. Further, the elements connected to each other by the connecting members, when subjected to a stress, can allow the stress to be diffused through the connecting members, and thereby suppress the stress from concentrating on the substrate sheet and the interface. Therefore, it is assumed that providing the connecting members is effective for suppressing the elements from falling off from the substrate sheet.

On the other hand, such formation of the connecting members may cause a decrease in the flexibility, the lightness or the like of the outsole. Thus, the connecting members are preferably manufactured to have a shape with a narrow width and a thin thickness to a certain degree. However, in this case, a molten resin must be made to flow into a narrow space for forming the connecting members at the time of injection molding, which may cause breaks of the resin in the connecting member. Further, in the case where a space for forming the connecting members is used as a flow path of the molten resin at the time of injection molding, the flow resistance increases in the flow path, which may cause insufficient resin pressure at the distal end of the flow path. This may cause a possibility that the injection molded article cannot be sufficiently suppressed from falling off from the substrate sheet.

Figure 1:
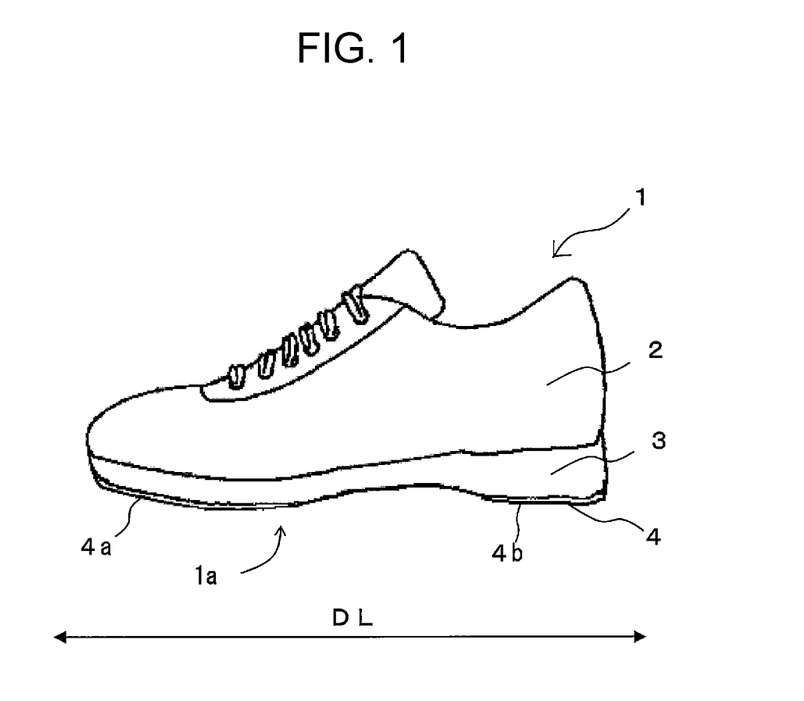
FIG. 1 is a schematic side view showing one form of a shoe.

The present disclosure achieved in view of the aforementioned circumstances will be hereinafter described by way of embodiments with reference to the drawings. As shown in FIG. 1, a shoe 1 of this embodiment has an upper material 2, a midsole 3, and an outsole 4.

Figure 2:
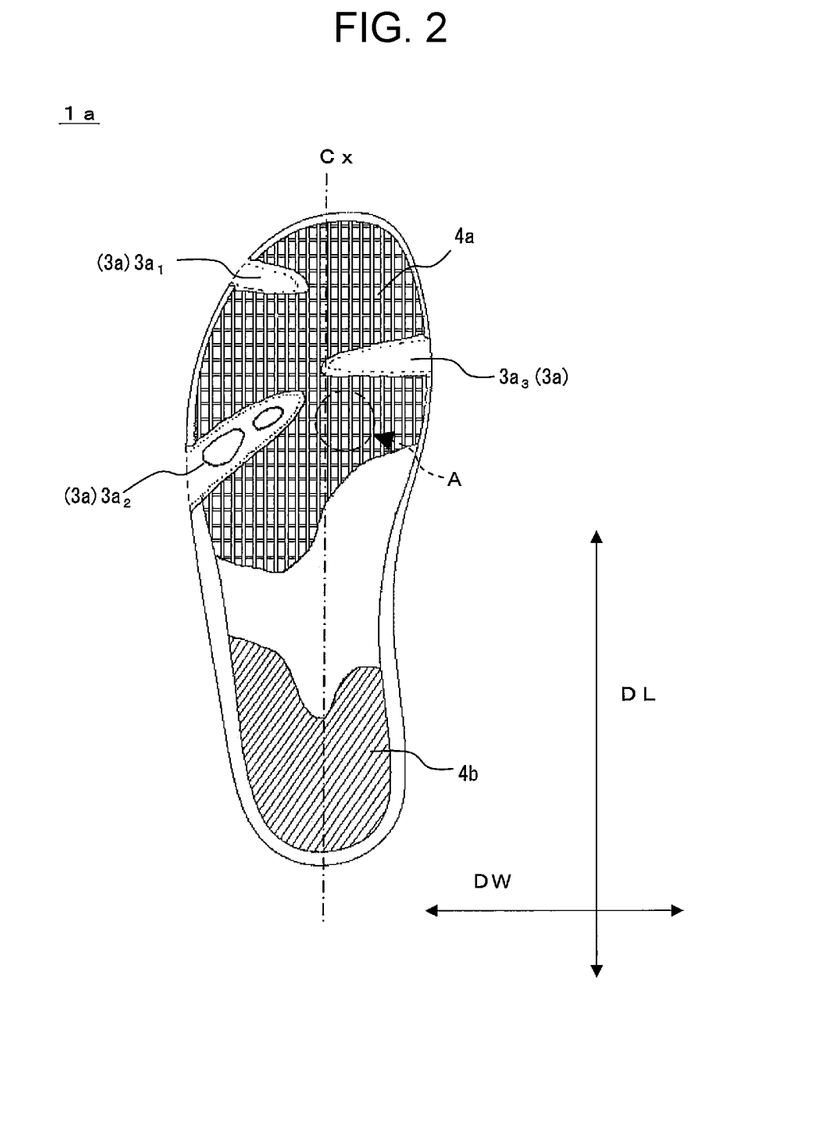
FIG. 2 is a schematic plan view showing the appearance of an outsole according to one embodiment, as viewed from the ground engaging surface side of the shoe.
Figure 3:
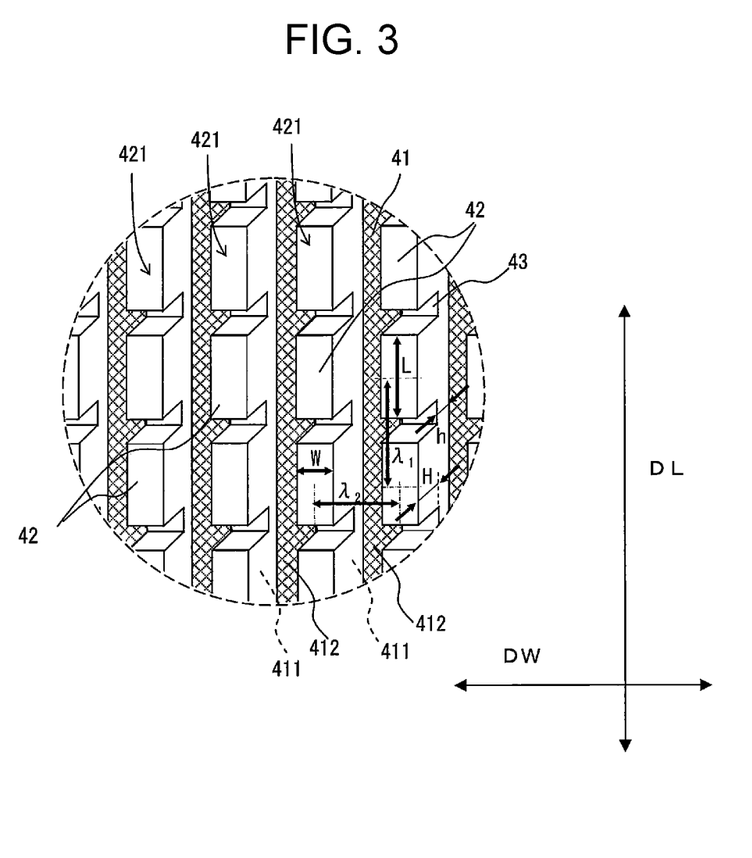
FIG. 3 is an enlarged view of an area surrounded by a dotted circle A of FIG. 2.

The midsole 3 of this embodiment has such a size that can cover entirely the sole of the foot when the shoe 1 is viewed from the ground engaging surface side. On the other hand, the outsole 4 of this embodiment is configured to partly cover this midsole 3 when the shoe 1 is viewed from the ground engaging surface side, as shown in FIG. 2 and FIG. 3. The outsole 4 of this embodiment includes two sheets forming a tread on a ground engaging surface 1a, namely a first sheet 4a and a second sheet 4b. More specifically, the outsole 4 of this embodiment includes the first sheet 4a arranged in a forefoot and the second sheet 4b arranged in a rearfoot. That is, the first sheet 4a is shaped and arranged to cover from the sole of the foot an area extending from the tip of the toe to the arch of the foot, and the second sheet 4b is shaped and arranged to cover from the sole of the foot a peripheral area of the heel. Hereinafter, the direction along which the first sheet 4a and the second sheet 4b are aligned with each other (the direction along a shoe center axis Cx) is sometimes referred to as the longitudinal direction DL of the shoe or foot, and a direction orthogonal to this longitudinal direction DL is sometimes referred to as the width direction DW.

Two sheet bodies forming the outsole 4 are adhered to the lower surface of the midsole 3. The first sheet 4a has a substrate sheet 41 adhered to the midsole 3. The first sheet 4a has a continuous body 421 composed of a plurality of protrusions 42 protruding from the lower surface of the substrate sheet 41 toward the ground engaging surface, in which each adjacent ones of protrusions 42 are connected to each other. The continuous body 421 of this embodiment is an injection molded article obtained by injection molding of a resin composition containing a thermoplastic resin as described later. The continuous body 421 is fixed to the substrate sheet 41 and integrated with the substrate sheet 41. The continuous body 421 includes protruding portions forming the protrusions 42, and connecting members each connecting adjacent ones of the protrusions. The connecting members of this embodiment are raised ridges 43 and connect each adjacent ones of the protruding portions through their portions close to the base end side in a protruding direction.

The first sheet 4a has a plurality of protrusions (protruding portions) 42 having a rectangular parallelepiped shape. The plurality of protrusions 42 have tip ends in the protruding direction to form the tread. The plurality of protrusions 42 of this embodiment have the same shape. The protrusions 42 have a rectangular parallelepiped shape each having a dimension in the longitudinal direction DL of the foot (hereinafter simply referred also to as the "longitudinal direction") which is larger than the dimension in the width direction DW of the foot (hereinafter simply referred also to as the "width direction").

The protrusions 42 of this embodiment are separated into plural groups, and adjacent ones of the protrusions 42 of each of the groups are connected to each other to constitute the continuous body 421. That is, the protrusions 42 constitute a plurality of the continuous bodies 421. A group of the protrusions 42, together with the raised ridges 43, constitutes each of the continuous bodies 421, in which adjacent ones of the protrusions 42 are connected to each other through their portions close to the base end side in the protruding direction with the raised ridges 43 that have a height lower than the protrusions 42. Each of the continuous bodies 421 of this embodiment linearly extends by way of connection with the raised ridges 43 toward one direction. Specifically, the protrusions 42 are connected in the longitudinal direction DL so that each of the continuous bodies 421 extends along the longitudinal direction DL. The outsole 4 of this embodiment has the plurality of continuous bodies 421 extending in parallel with each other. That is, the first sheet 4a includes plural strips of the continuous bodies 421 extending in the longitudinal direction DL, and these continuous bodies 421 are arranged on the first sheet 4a at intervals in the width direction DW.

The substrate sheet includes a covered portion 411 that is covered by the continuous body 421, and an exposed portion 412 that is not covered by the continuous body to have a surface of the substrate sheet exposed to the outside therethrough. The exposed portion extends along the continuous body 421 extending in the longitudinal direction DL and is arranged on each side of one continuous body. Thus, in the outsole 4 according to this embodiment, the covered portions 411 and the exposed portions 412 are alternately arranged in the width direction DW.

The protrusions 42 and the raised ridges 43 of the continuous bodies 421 of this embodiment are made of the same resin composition. On the other hand, the substrate sheet 41 is made of a material different from that of the protrusions 42 and the raised ridges 43, and is formed with a fibrous material (fiber sheet) in this embodiment.

In the covered portion 411 of the first sheet 4a, the fiber sheet is impregnated with a part of the resin composition that forms the continuous body 421 so that the continuous body is adhered to the fiber sheet. On the other hand, the exposed portion 412 is not impregnated with the resin composition.

The size and pitch of the protrusions 42 are set preferably within a certain range in order to allow the shoe 1 of this embodiment to exhibit excellent grip performance on the asphalt concrete road surface. The protrusions 42 have a protruding height H of preferably not less than 0.01 mm and not more than 5 mm from the upper surfaces of the raised ridges 43. The protrusions 42 have a protruding height H of more preferably not less than 0.5 mm and not more than 4 mm, and even more preferably not less than 0.6 mm and not more than 1.8 mm from the upper surfaces of the raised ridges 43. The protrusions 42 have a protruding height of preferably not less than 0.02 mm and not more than 10 mm, more preferably not less than 1 mm and not more than 8 mm, and even more preferably not less than 2 mm and not more than 7 mm from the substrate sheet 41. The size and pitch of the raised ridges 43 are set preferably within a certain range in order to allow the shoe 1 of this embodiment to exhibit good bend performance. The raised ridges 43 have a protruding height h of preferably not less than 0.01 mm and not more than 5 mm, more preferably not less than 0.1 mm and not more than 3.0 mm, and even more preferably not less than 0.5 mm and not more than 2.5 mm from the substrate sheet 41.

Taking into account excellent grip performance on the asphalt concrete road surface, the protrusions 42 preferably have a tip end shape (a shape of the ground engaging face)

as described below. Specifically, a length L of the protrusions 42 in the direction in which the continuous body 421 extends (longitudinal direction DL) is preferably not less than 1 mm and not more than 10 mm, more preferably not less than 2 mm and not more than 8 mm, and even more preferably not less than 3 mm and not more than 7 mm. A pitch $\lambda_1$ (distance between the centers) of the protrusions 42 in the extending direction of the continuous body 421 (longitudinal direction DL) is preferably not less than 2 mm and not more than 20 mm, more preferably not less than 3 mm and not more than 15 mm, and even more preferably not less than 4 mm and not more than 10 mm. The proportion length of the protruding portions of the protrusions 42 to the entirety of the continuous body 421 ($L/\lambda_1 \times 100\%$) is preferably not less than 40% and not more than 99%, more preferably not less than 50% and not more than 95%, and even more preferably not less than 60% and not more than 90%. The width W of the protrusions 42 in the direction (width direction DW) orthogonal to the extending direction of the continuous body 421 is preferably not less than 0.5 mm and not more than 10 mm, more preferably not less than 1 mm and not more than 8 mm, and even more preferably not less than 1.5 mm and not more than 5 mm. The ratio of the length L to the width W of the protrusions 42 (L/W) is preferably not less than 1 and not more than 10, more preferably not less than 1.5 and more preferably not more than 8, and even more preferably not less than 2 and not more than 5. A pitch $\lambda_2$ (distance between the centers) of the continuous body 421 in the direction (width direction DW) orthogonal to the extending direction of the continuous body 421 is preferably not less than 0.5 mm and not more than 10 mm, more preferably not less than 1 mm and not more than 8 mm, and even more preferably not less than 1.5 mm and not more than 5 mm. It is preferable that the continuous body 421 occupy a space volume from the substrate sheet 41 to the ground engaging surface by a certain proportion or more. A space volume V (mm$^3$) from the substrate sheet 41 to the ground engaging surface can be obtained by "S×T", where an area of the substrate sheet 41 in the first sheet 4a is represented by S (mm$^2$), and a thickness of the space from the substrate sheet 41 to the ground engaging surface is represented by T (mm: T=H+h). Accordingly, when the value obtained by summing up the volumes of all the continuous bodies 421 provided in the first sheet 4a is represented by $V_1$ (mm$^3$), the proportion ($V_1/V \times 100\%$) by which the total value ($V_1$) occupies the space volume (V) is preferably not less than 30% and not more than 90%, more preferably not less than 40% and not more than 80%, and even more preferably not less than 50% and not more than 75%.

The first sheet 4a of this embodiment is formed by integrating the substrate sheet and the continuous bodies 421 at the time of forming the continuous body 421 by injection molding. That is, the first sheet 4a of this embodiment is formed by injection molding the heated and molten resin composition into a molding die in which the substrate sheet 41 is placed. A flow direction of the molten resin during injection molding of the continuous body 421 (injection direction) is a direction in which the continuous body 421 extends. That is, the flow direction of the molten resin is a direction along the longitudinal direction DL of the shoe. The entirety or a part of the continuous bodies 421 may extend along the flow direction of the molten resin.

The flow direction of the molten resin in injection molding of this embodiment is not a direction orthogonal to the surface of the substrate sheet, but a direction along the surface of the substrate sheet. When the injection molding is performed in the direction orthogonal to the substrate sheet, the structure of the molding die used for injection molding is complicated. In contrast, according to this embodiment, the structure of the molding die can be simplified for the reason mentioned above. Thus, according to this embodiment, the outsole can be manufactured in efficient manner.

When the continuous body 421 having a desired shape as aforementioned is formed, the molten resin passes through narrow flow paths. In this case, since a relatively high resin pressure is generated in the molten resin during production, the continuous bodies 421 exhibit excellent adhesiveness to the substrate sheet 41. In particular, since the substrate sheet 41 of this embodiment is made of a fiber sheet, spaces between the fibers of the fiber sheet can be impregnated with the molten resin using the pressure. Thereby, high adhesiveness can be exhibited between the substrate sheet 41 and the continuous bodies 421 in this embodiment.

In this embodiment, the connecting members having a relatively narrow cross-sectional area with respect to the flow direction of the molten resin, and the protruding portions having a larger cross-sectional area than that of the connecting members, are alternately provided in the flow direction of the molten resin. Thus, the portion for forming each connecting member within the molding die is smaller in cross sectional area for the resin flow path than the portion for forming each protruding portion. Therefore, the portion for forming each connecting member tends to cause a high flow resistance of the molten resin. That is, the pressure of the molten resin acting on the substrate sheet at the time of injection molding is relatively high in the connecting members. Thus, the outsole 4 of this embodiment has an excellent adhesiveness to the substrate sheet 41, particularly to the connecting members. While the protruding portions are mainly subjected to the stress during use of the shoe, the connecting members in the shoe of this embodiment, which are firmly adhered to the substrate sheet, are respectively provided on both the front and rear sides of each of the protruding portions. Therefore, even when a strong stress is applied to the protruding portions, the connecting members arranged on the front and rear sides of each of the protruding portions can prevent the protruding portions from falling off from the substrate sheet.

In a molding die for producing an injection molded article such as the aforementioned continuous body, the cross-sectional area and the cross-sectional shape of the resin flow path change along the flow direction of the molten resin at the time of injection molding. Thus, the shear rate of the molten resin increases or decreases depending on the location during the process of filling the molding die with the molten resin in injection molding. The resin composition preferably has a low melt viscosity in order to allow the molten resin composition to reach every corner in the molding die at the time of forming the continuous bodies. In this regard, the lower the shear rate, the higher the melt viscosity of the resin composition. Thus, it is preferable that the resin composition have a low melt viscosity even under low shear rate conditions. The melt viscosity of the resin composition can be decreased by increasing the temperature of the molten resin. However, if the resin composition in injection molding is set at an excessively high temperature in order to decrease the melt viscosity, an oxidation reaction or a thermal decomposition reaction may occur and thereby deteriorate the resin. Thus, it is preferable that the resin composition used for forming the continuation bodies have a low melt viscosity even at a low shear rate under certain temperature conditions.

From this viewpoint, this embodiment uses a resin composition having, when the thermal melting temperature is T (° C.), a melt viscosity ($\eta_{100}$) at a shear rate 100 (sec$^{-1}$) in at least part of the temperature range of (T+0° C.) to (T+50° C.) satisfying formula (1) below.

$$\eta_{100} \leq 900 \text{ Pa·s} \quad (1).$$

However, excessively low melt viscosity may cause the entrainment of bubbles during injection molding. From this viewpoint, this embodiment preferably uses a resin composition having a melt viscosity ($\eta_{100}$) not less than 100 Pa·s at any temperature in the temperature range that satisfies formula (1) above. That is, it is preferable that, in the resin composition, the melt viscosity ($\eta_{100}$) at a shear rate 100 (sec$^{-1}$) satisfy formula (a) below in at least part of the temperature range of (T+0° C.)-(T+50° C.).

$$100 \text{ Pa·s} \leq \eta_{100} \leq 900 \text{ Pa·s} \quad (a)$$

It is more preferable that the resin composition have a melt viscosity ($\eta_{100}$) of not less than 100 Pa·s and not more than 650 Pa·s in at least part of the temperature range of (T+0° C.)-(T+50° C.). That is, the resin composition preferably satisfies formula (b) below.

$$100 \text{ Pa·s} \leq \eta_{100} \leq 650 \text{ Pa·s} \quad (b)$$

In this description, the "thermal melting temperature" means the temperature determined by performing heat flux differential scanning calorimetry (heat flux DSC) on the resin composition. More specifically, In the case where the resin composition includes a crystalline resin and exhibits a melting point when the measurement of heat flux differential scanning calorimetry has been made, the thermal melting temperature usually means the melting point. In the case where the resin composition does not substantially include crystalline resin and exhibits only a glass transition temperature when the measurement of heat flux differential scanning calorimetry has been made, the thermal melting temperature usually means the glass transition temperature. For a block polymer having hard segments, such as styrene elastomer, which is not generally recognized as crystalline resin, a melting point derived from the hard segments is observed by the measurement of heat flux differential scanning calorimetry. In the case where the resin composition includes such a block polymer, the thermal melting temperature means the melting point. That is, among the transition temperatures, such as the "glass transition temperature" and the "melting point", exhibited when the measurement of heat flux differential scanning calorimetry has been made on the resin composition, the thermal melting temperature means, in principle, the transition temperature observed on the highest temperature side. Here, the "melting point" and the "glass transition temperature" can be determined by the method defined in JIS K7121-1987 "Testing Methods for Transition Temperatures of Plastics", and determined by measurement at a heating rate of 10° C./min. The melting point means the "melting peak temperature" in the aforementioned standard, and the "glass transition temperature" means the "midpoint glass transition temperature" in the aforementioned standard.

As described above, generally, the lower the shear rate, the higher the melt viscosity of the resin composition. In other words, the melt viscosity of the resin composition decreases when the shear rate is high. The high shear rate is generally indicative of a high moving speed of the resin composition within the mold. When the resin composition has a low viscosity in an area where the resin composition moves fast, entrainment of bubbles is likely to occur. Thus, the melt viscosity of the resin composition preferably gradually decreases in response to the increase of the shear rate.

Therefore, in the resin composition, the measurement results of the resin composition obtained by measuring the melt viscosity of the resin composition while changing the shear rate from 100 (sec$^{-1}$) to 2500 (sec$^{-1}$) is preferably represented by an approximate straight line shown in general formula (2) below in at least part of the temperature range in the aforementioned range. In the following formula, "$\eta$" represents the melt viscosity (Pa·s), and "D" represents the shear rate. Further, "A" represents the slope of the approximate straight line with a value of more than 0 and not more than 350, and "C" represents the intercept of the approximate straight line (i.e., y-axis intercept of the approximate straight line with x-axis as the shear rate and y-axis as the melt viscosity).

$$\mathrm{Log}_{10}\eta = -A \cdot \log_{10} D + C \quad (2)$$

The value of the negative slope (A) is particularly preferably more than 0 and not more than 250 at any temperature in the range of (T+0° C.) to (T+50° C.). The temperature range in which the melt viscosity ($\eta_{100}$) of the resin composition satisfies the requirements of formula (1), and the temperature range in which the relationship between the melt viscosity and the shear rate can be represented by the approximate straight line shown in the aforementioned general formula (2), preferably at least partially overlap in any part of the range of (T+0° C.) to (T+50° C.).

In the range of (T+0° C.) to (T+50° C.), the resin composition preferably satisfies the conditions related to the aforementioned formulae (1) and (2) over the range of not less than 10° C., and more preferably satisfies the conditions related to the aforementioned formulae (1) and (2) over the range of not less than 20° C. The resin composition particularly preferably satisfies the conditions of formula (1) and formula (2) in the entire range of (T+0° C.) to (T+50° C.).

The resin composition exhibiting the melting characteristics as described above can be prepared by employing a thermoplastic resin as the base polymer. Whether or not the resin composition exhibits the melt viscosity as described above can be confirmed by the method described in JIS K7199:1999 "Plastics-Determination of the fluidity of plastics using capillary and slit-die rheometers". The melt viscosity can be confirmed, for example, using a capillary rheometer (manufactured by Malvern, product number "RH7/10"). More specifically, the melt viscosity can be measured by the following steps: attaching a capillary die (bore: 1 mm, length: 16 mm) to the lower end of a cylinder of the capillary rheometer; fully heating and melting the resin composition as a sample in the cylinder at a temperature for measurement; inserting a piston into the cylinder from the upper end; and changing the descending speed of the piston (the extrusion speed from the orifice) to thereby change the shear rate from 100 (sec$^{-1}$) to 2500 (sec$^{-1}$). The term "melt viscosity" throughout this description means the melting characteristics of the resin composition measured by the method described above unless otherwise noted.

A linear approximation can be performed by the least squares method based on the measured results obtained from the capillary rheometer, which are plotted on a double logarithmic graph in which the abscissa represents the logarithmic value of the shear rate (D: sec$^{-1}$) and the ordinate represents the logarithmic value of the melt viscosity ($\eta$: Pa·s) using the analysis software attached to the device. That is, the above described general formula (1) and the magnitude of the negative slope of the straight line (value of A) can be determined using the analysis software attached to the capillary rheometer.

As the thermoplastic resin serving as the base polymer of the resin composition, one or two or more selected from the group consisting of, for example, polyethylene resin (PE), polypropylene resin (PP), ethylene-vinyl acetate copolymer resin (EVA), ethylene-methyl acrylate copolymer resin (EMA), ethylene-ethyl acrylate copolymer resin (EEA), ethylene-methyl methacrylate copolymer resin (EMMA), a cyclic polyolefin resin, (COP, COC), polyamide resin (PA), polyester resin (PET, PBT, PEN), polystyrene resin (GPPS, HIPS, AS, ABS), an acrylic resin, polycarbonate resin (PC), polyvinyl chloride resin (PVC), and 1,2-butadiene resin (PBD) can be employed.

The thermoplastic resin to be contained in the resin composition may be those generally referred to as a thermoplastic elastomer or the like. As the thermoplastic elastomer, one or two or more selected from the group consisting of, for example, an olefin-based thermoplastic elastomer (TPO), a styrene-based thermoplastic elastomer (TPS), an amide-based thermoplastic elastomer (TPA), a urethane-based thermoplastic elastomer (TPU), and an ester-based thermoplastic elastomer (TPC) can be employed.

Together with the thermoplastic resin, a rubber or a thermosetting resin may be contained in the resin composition. As the rubber, one or two or more selected from the group consisting of, for example, natural rubber (NR), isoprene rubber (IR), butadiene rubber (BR), styrene-butadiene rubber (SBR), butyl rubber (IIR), chloroprene rubber (CR), acrylonitrile butadiene rubber (NBR), ethylene propylene rubber (EPR), ethylene propylene diene rubber (EPDM), silicone rubber (Q), urethane rubber (U), fluororubber (FKM), chlorinated polyethylene (CM), and chlorosulfonated polyethylene (CSM) can be employed.

As the thermosetting resin, one or two or more selected from the group consisting of, for example, an epoxy resin, a phenol resin, a polyurethane resin, a melamine resin, and an unsaturated polyester resin can be employed.

In the resin composition, additives may be further contained, such as a slipping agent, a mold releasing agent, a lubricant, an aging retardant, an antioxidant, a weather-proof agent, a flame retarder, a pigment, an electrostatic preventing agent, an antimicrobial agent, a deodorizer, an inorganic filler, a silane coupling agent, and a tackifier. The resin composition does not necessarily contain only one type among these additives, and may contain two or more types in combination.

The fiber sheet (substrate sheet 41) which, together with the continuous bodies 421 that are injection molded articles formed by the resin composition, forms the first sheet 4a can be knitted fabric, woven fabric or nonwoven fabric. The term "nonwoven fabric" is used herein to mean that it includes felt in addition to those defined in JIS L0222. The substrate sheet 41 used in forming the first sheet 4a preferably does not have an excessive thickness, and a sheet having a thickness smaller than that of conventional felt is preferably used. The substrate sheet 41 has a thickness of preferably not less than 0.1 mm and not more than 2 mm. The substrate sheet 41 has a thickness of more preferably not less than 0.2 mm and not less than 1 mm.

As the substrate sheet 41, a stretchable cloth called such as one-way stretch can be used. It is preferable that the substrate sheet 41 be used so as to allow a direction, in which its elongation power is highest when it is measured, to be aligned along the extending direction of the continuous bodies 421. More specifically, the first sheet 4a is preferably configured so that an angle (acute angle) between the direction in which the elongation power when the substrate sheet 41 is elongated by 30% is highest and the extending direction of the continuous bodies 421 is not more than 30 degrees. The aforementioned angle is more preferably not more than 20 degrees, and even more preferably not more than 15 degrees.

The elongation power of the fiber sheet employed as the substrate sheet 41 when it is elongated by 30% can be measured according to JIS L1096:2010 "Testing methods for woven and knitted fabrics" "8. 16. 3 elongation power", "B method".

The shoe 1 exhibits excellent grip performance during leg's forward and backward moving action such as running not only by forming the continuous bodies 421 along the longitudinal direction DL, but also by configuring the first sheet 4a using the substrate sheet 41 that exhibits a high elongation power in the longitudinal direction DL. The shoe 1 gives comfortable wearing feeling because the first sheet 4a exhibits good stretching properties in the width direction DW.

When the direction in which the elongation power of a fiber sheet (at elongation of 30%) is highest is designated as a first direction, and the direction orthogonal to the first direction is designated as a second direction, the ratio (F2/F1) of the elongation power in the second direction (F2) to the elongation power in the first direction (F1) is preferably not less than 0.01 and not more than 0.8. The ratio is more preferably not more than 0.6, and even preferably not more than 0.5.

The shoe 1 is also advantageous in that the first sheet 4a can be easily manufactured by aligning the direction in which the elongation power of the substrate sheet 41 is highest with the extending direction of the continuous bodies 421. The first sheet 4a of this embodiment is formed by integrating the substrate sheet and the continuous bodies 421 at the time of forming the continuous bodies 421 by injection molding as described above. At this time, the first sheet 4a is produced by a method that includes, for example, placing a fiber sheet in a molding die having a molding face corresponding to the shape of the continuous bodies 421, and injecting the heated and molten resin composition into the molding die. Moreover, the first sheet 4a is produced by injection molding, in which the injecting is directed from one end side toward the other end side of the continuous bodies 421.

Assuming the case where plural protrusions that form no continuous bodies (separate protrusions) are formed by injection molding, the resin composition is generally injected into the molding die to have its injection direction being perpendicular to the fiber sheet, unlike the first sheet 4a. In this case, the molding die is generally required to have the same number of gates as the number of the protrusions, and have runners having a complicated shape. On the other hand, the first sheet 4a is provided with the protrusions that form the plural continuous bodies 421 of which the connection directions are the same as each other, and therefore the first sheet 4a can be produced in the injection molding by injecting the resin composition into the molding die in a direction parallel to the surface of the fiber sheet. Further, the number of gates of the molding die for producing the first sheet 4a can be reduced as compared with the number of the protrusions, and for example, the number of the gates can be equal to the number of the continuous bodies 421. Still further, when the first sheet 4a is produced by the injection molding, it is possible to suppress or prevent occurrence of deformation of the fiber sheet at the time of injecting the resin composition into the molding die by aligning the direction in which the elongation power of the fiber sheet is high with the extending direction of the continuous bodies 421. Thus, the first sheet 4a can be produced while suppressing any limitations on the molding conditions for the injection molding. That is, the first sheet 4a is also advantageous in that it can be produced by a simple method.

When the first sheet 4a is produced by the injection molding, the mechanical performance characteristics of the continuous bodies 421 in the longitudinal direction can be differentiated from those in the width direction by causing molecular orientation in the resin composition. Whether the molecules of the continuous bodies 421 are oriented or not, and how high the molecules are oriented can be confirmed by the polarized Raman spectroscopy analysis using specimens cut out from the continuous bodies 421.

The substrate sheet 41, which is a fiber sheet, exerts various effects as described above, but may be a sheet other than a fiber sheet. A resin film employed as a substrate sheet can have both excellent stiffness and a reduced thickness, and therefore provide a lightweight outsole. A fiber reinforced plastic sheet employed as a substrate sheet can easily have both excellent stiffness and a reduced thickness, and therefore provide a more lightweight outsole. A resin foamed sheet employed as a substrate sheet enables a resin foam provided as midsole to be used as a substrate sheet, which can simplify the shoe manufacturing process. In this case, the substrate sheet can have a thickness suitable as midsole. A non-foamed resin sheet employed as a substrate sheet can have an increased stiffness, which enables deformation of outsole to be easily controlled.

When these materials are employed as the substrate sheet, they are prepared with through holes formed at plural places corresponding to the covered portions 411, and are subjected to injection molding as mentioned above, so that part of the resin composition of the continuous bodies 421 can be made to flow out through the through holes onto the side opposite to the side on which the continuous bodies 421 are formed. The flown-out resin composition can form protrusions on the side opposite to the side of the substrate sheet, on which the continuous bodies 421 are formed, and the protrusions each have an area larger than that of the corresponding through hole in plan view. Thus, the continuous bodies 421 are connected with the protrusions on the opposite side through the through holes, thereby being rigidly secured to the substrate sheet.

The first sheet 4a can be produced using two kinds of the resin composition prepared in different types, which enables switching the kind of the resin composition to be used during injection molding. When a first resin composition having a relatively low melt viscosity and a second resin composition having a higher melt viscosity than the first resin composition are prepared, and the second resin composition is injected subsequent to the first resin composition to form one continuous body, the back pressure can be applied to the first resin composition, which has been injected preceding to the second resin composition, by the second resin composition having a high melt viscosity, so that the resin composition can reliably reach every corner in the molding die.

Further, the first sheet 4a can be produced using two kinds of resin compositions prepared in different colors, which enables switching the kind of the resin composition during injection into the molding die. In this case, the first sheet 4a that has the continuous bodies 421 each having one end side and the other end side formed in different colors with gradation in the middle can be produced. Still further, the first sheet 4a can be also produced using two kinds of resin composition prepared with the mechanical performance characteristics different from each other, which enables switching the kind of the resin composition during injection into the molding die. In this case, the first sheet 4a that has the continuous bodies 421 each having one end side and the other end side in the longitudinal direction respectively formed with the different mechanical performance characteristics with intermediate mechanical performance characteristics in the middle can be produced. The first sheet 4a may be produced using three or more kinds of the resin composition. The first sheet 4a may be produced by changing the kind of the resin composition for each of the continuous bodies 421.

In the injection molding, the molten resin composition to be injected into the molding die can easily reach every corner in the molding die when the resin composition has a low viscosity. The resin composition preferably has a low melt viscosity in terms of the impregnating ability to the fiber sheet (adhesiveness to the fiber sheet). The resin composition is preferably used for injection molding under such temperature conditions as to have a melt viscosity of not more than 900 Pa·s at a shear rate of 100 s$^{-1}$, more preferably used for injection forming under the temperature conditions to have a melt viscosity of not more than 650 Pa·s, particularly preferably used for injection molding under the temperature conditions to have a melt viscosity of not more than 600 Pa·s, and most preferably used under the temperature conditions to have a melt viscosity of not more than 400 Pa·s.

This embodiment is described by taking, for example, the case where the outsole is formed by the first sheet 4a with all the protrusions 42 having the same rectangular parallelepiped shape, but it is not necessary that the protrusions 42 forming the continuous body 421 have the same size and have the rectangular parallelepiped shape. For example, the protrusions may have a polygonal column shape having a polygonal section other than a rectangular section taken along a plane parallel to the substrate sheet 41, or a cylindrical shape having a perfect circle section, an elliptic section, or an oval section taken along the same plane. Further, the protrusions may have a polygonal cone shape or a conical shape, or a truncated conical shape (a truncated pyramid shape, a truncated cone shape or the like). Still further, the protrusions may have a hemispherical shape or any irregular shape. Also in these cases, the preferable ranges for the pitch of the protrusions in the longitudinal direction DL and the pitch of the continuous bodies in the width direction DW are the same as those for the case where all the protrusions have a rectangular parallelepiped shape. The protrusions may have a linear shape or a meshed shape. The meshed protrusions may have a lattice pattern or a honeycomb pattern. For the meshed protrusions (protruding portions) having a lattice pattern (lattice structure) or a honeycomb pattern (honeycomb structure), when the total area of the substrate sheet 41 covered by all the continuous bodies is 100%, the area of the substrate sheet 41 covered by the protrusions may be, for example, not less than 40% and not more than 99%.

Figure 4:
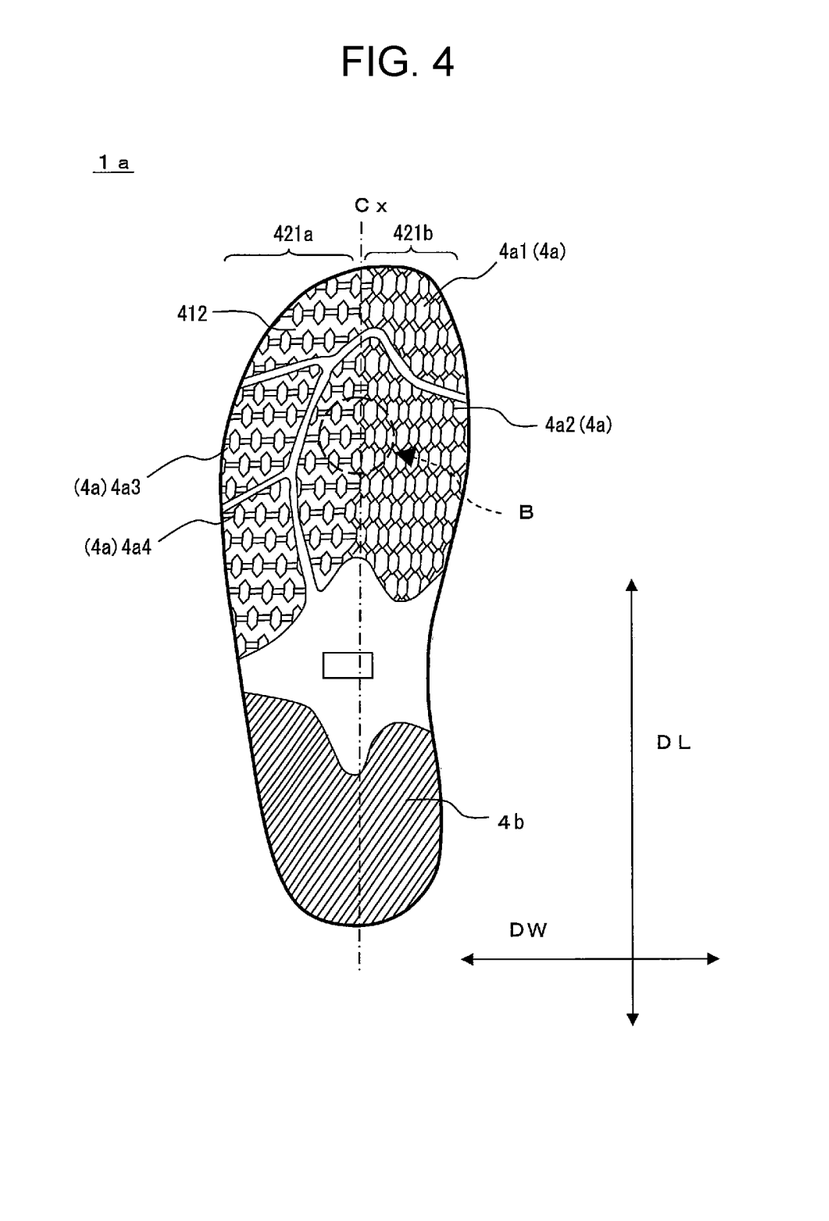
FIG. 4 is a schematic plan view showing the appearance of an outsole according to another embodiment, as viewed from the ground engaging surface side of the shoe.
Figure 5:
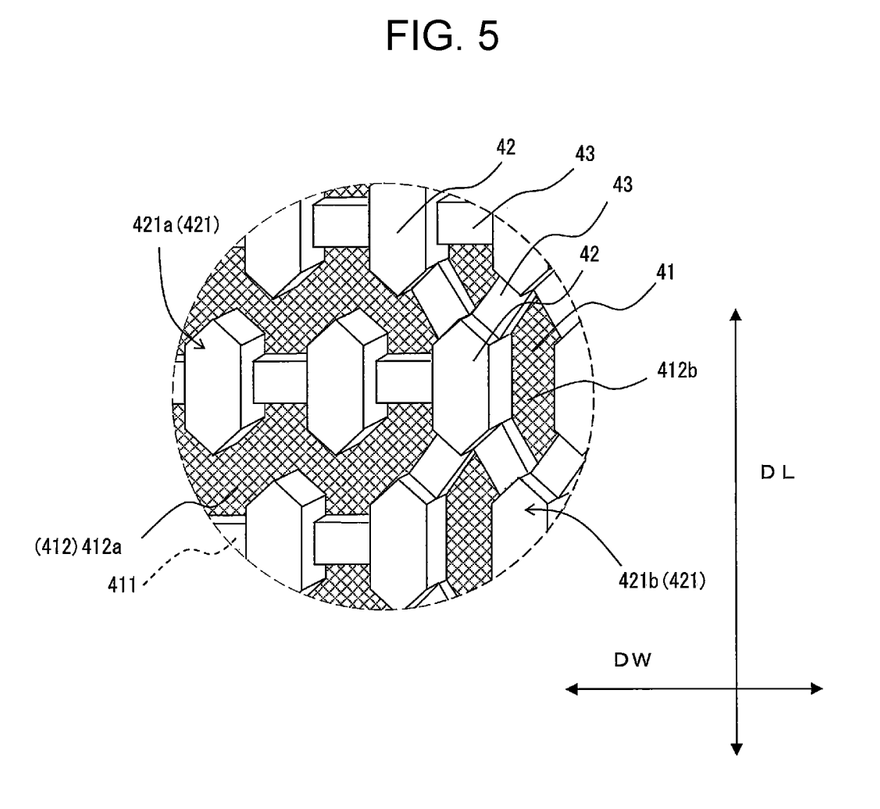
FIG. 5 is an enlarged view of an area surrounded by a dotted circle B of FIG. 4.

The connecting form of the connecting member for connection between each adjacent two protrusions is not necessarily one linear body, but may be two or more linear bodies or a meshed body. The connecting member do not necessarily have a linear shape, but may have a cylindrical shape or a polygonal column shape. That is, as shown in FIG. 4 and FIG. 5, the continuous body 421 (injection molded article) may partly or entirely have a mesh shape. The outsole shown in FIG. 3 and FIG. 4 is the same as the outsole shown in FIG. 2 and FIG. 3 in that it includes the first sheet 4a arranged in a forefoot and the second sheet 4b arranged in a rearfoot. The first sheet 4a of the outsole 4 shown in FIG. 4 and FIG. 5 is composed of four separate pieces, namely a first separate piece 4a1, a second separate piece 4a2, a third separate piece 4a3, and a fourth separate piece 4a4. That is, the outsole 4 shown in FIG. 4 and FIG. 5 is actually composed of 5 sheets.

In the outsole 4, only the continuous bodies 421 on the laterally outside respectively have linear shapes, and the continuous bodies 421 on the laterally inner side have a meshed pattern. Further, in the outsole 4, the portion of the continuous bodies 421 where the continuous bodies 421 have a linear shape (hereinafter referred also to as the "linearly shaped portion 421a") extends not in the longitudinal direction DL but in the width direction DW.

The exposed portions 412 of the outsole 4, in which the substrate sheet 41 is exposed toward the ground engaging surface, extend along the continuous bodies 421 in the linearly shaped portion 421a, while the exposed portions 412 are present as dots in the portion where the peripheral areas thereof are surrounded by the covered portions 411 to form the continuous bodies 421 in a meshed pattern (hereinafter referred also to as the "meshed portion 421b"). That is, there is an area where the exposed portions 412 are present as plural linear forms (linear pattern area) and an area where exposed portions 412 are present as dots (dot pattern area). At least one end of each of the exposed portions 412 in the linearly shaped portion 421a reaches a peripheral edge of the substrate sheet. The end edges of the exposed portions 412 extending along the continuous bodies 421 are located at the peripheral edge of the substrate sheet 41, so that the outsole 4 exhibits excellent flexibility.

The linearly shaped portion 421a and the meshed portion 421b are arranged in the second separate piece 4a2 in the same manner as the first separate piece 4a1, but only the linearly shaped portion 421a is located in each of the third separate piece 4a3 and the fourth separate piece 4a4. In the linear pattern area of the exposed portions 412 in each of the third separate piece 4a3 and the fourth separate piece 4a4, where the exposed portions 412 are present as plural linear forms in parallel, the both ends of each of the exposed portions 412 reach the peripheral edge of the substrate sheet.

According to the outsole shown in FIG. 2, only each adjacent two front and rear protrusions 42 in the extending direction of the continuous bodies 421 are connected to each other, but, according to the outsole shown in FIG. 4, each three or more of the protrusions 42 are connected to each other in the meshed portion 421b. Specifically, in the meshed portion 421b, one protrusion 42 is connected to four different protrusions 42 located in the periphery respectively by four raised ridges 43. Accordingly, in this outsole 4, the protrusions 42 in the meshed portion 421b more hardly fall off from the substrate sheet 41.

According to this embodiment, the shoe 1 can exhibit excellent grip performance because the meshed portion 421b of the continuous bodies 421 is arranged on the laterally inner side of the forefoot to which a large force is likely to be applied during running or the like. The shoe of this embodiment can exhibit excellent grip performance as well as prevent or suppress the falling-off of the protrusions by providing a larger number (in average) of separate protrusions to be connected to each one protrusion in each of the continuous bodies on the laterally inner side of the forefoot than the number of the separate protrusions on the laterally outside of the forefoot. In this embodiment, the shoe 1 can exhibit excellent bend performance by having the linearly shaped portion 421a extending in the width direction DW.

The second sheet 4b which, together with the first sheet 4a, constitutes the outsole 4 may be formed using the same material as that of the first sheet 4a or a different material therefrom. When the second sheet 4b is formed using the different material from the first sheet 4a, it can be in the form of an elastomer sheet having an uneven surface or the like. That is, although the rearfoot sole is less likely to be applied with complex stress compared with the forefoot sole which makes complex movements during walking or the like, the second sheet 4b may be provided with the same continuous bodies as those of the first sheet 4a for the purpose of giving the anisotropy to the mechanical performance characteristics or preventing falling-off of the protrusions. Therefore, the second sheet 4b may be the same as a sheet conventionally used for outsoles.

Conventionally known materials can be used for the members other than the outsole which constitute the shoe 1, such as the upper member 2 and the midsole 3. The shoe 1 provided with the aforementioned outsole 4 can easily satisfy the required mechanical performance characteristics.

The outsole and shoe according to the present disclosure is not limited to the abovementioned embodiment, but various modifications can be made without departing from the gist of the present disclosure. The outsole of the present disclosure may extend upward to constitute a part of the upper member.

EXAMPLES

Next, the present disclosure will be described in more detail by way of Examples, without limitation thereto. First, textile fabric (stretching fabric) for forming a substrate sheet was prepared. Subsequently, five kinds of resin compositions were prepared in total as the resin composition for forming an injection molded article, namely, two kinds of resin compositions (TPU1, TPU2) respectively containing two kinds of urethane-based thermoplastic elastomers as the main components, two kinds of resin compositions (Olefin1, Olefin2) respectively containing two kinds of olefin-based thermoplastic elastomers as the main components, and a resin composition (Amide1) containing an amide-based thermoplastic elastomer as the main component.

Figure 6:
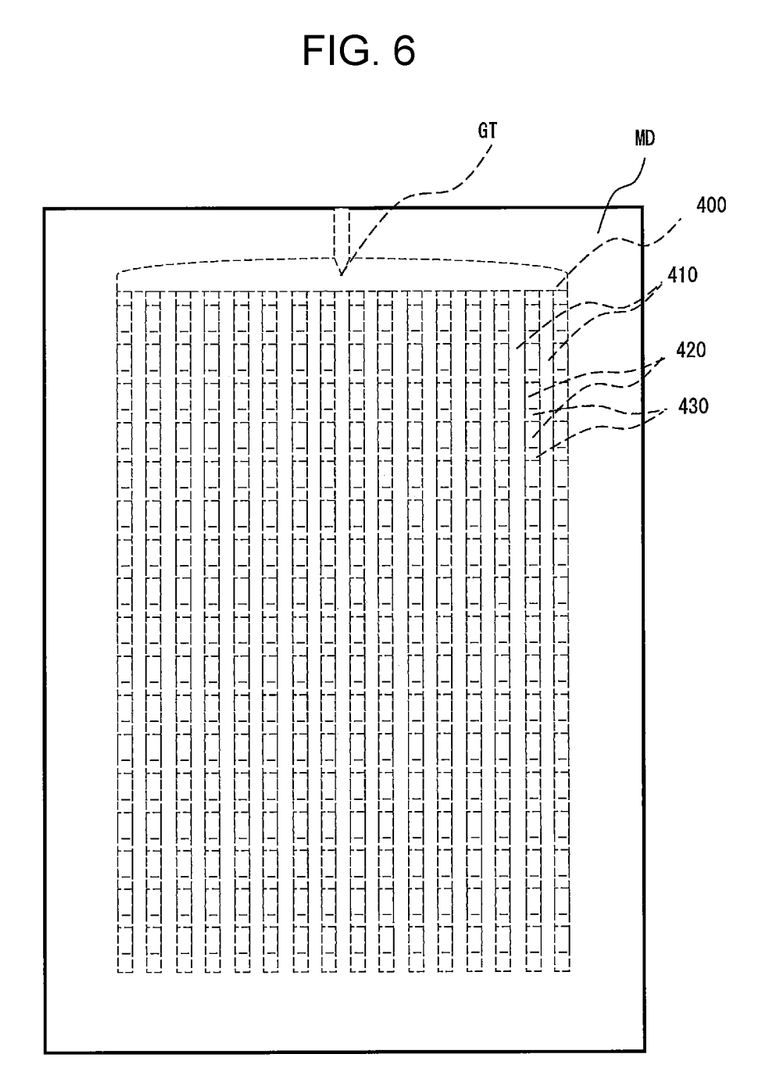
FIG. 6 is a schematic view of a mold used in the evaluation in the embodiments.

A sheet body for outsole as shown in FIG. 3 was produced using the substrate sheet and the resin composition as described above. A mold MD as shown in FIG. 6 was used for producing the sheet body. The mold MD can form a comb-shaped injection molded article in which a plurality of linear continuous bodies in parallel with each other are connected on one end side as shown in this Figure. The mold MD is configured to allow the substrate sheet to be placed inside the mold MD, which enables fixing the comb-shaped injection molded article to one surface side of the substrate sheet by performing injection molding in the state where the substrate sheet is placed in the mold MD. The mold MD includes a gate GT for allowing a molten resin composition to flow in the mold MD therethrough, and a cavity 400 for forming an injection molded article by the resin composition flown from the gate GT. The mold MD includes grooves for forming continuous bodies and ridges 410 for forming exposed portions in which the substrate sheet is exposed between each adjacent continuous bodies, and is configured to allow top ends of the ridges 410 in a protruding direction to contact a surface of the substrate sheet at the time of injection molding. Each of the grooves of the mold MD includes first recessed parts 420 that are relatively deeply recessed respectively corresponding to the protrusions, and second recessed parts 430 that are shallower than the first recessed parts 420 to form the raised ridges other than the protrusions. In the mold MD, the grooves have about 2 mm in width and about 200 mm in length, the first recess parts 420 have about 3 mm in depth, the second recess parts 430 have about 1 mm in depth, and the first recess parts 420 have about 5 mm in length and the second recess parts 430 have about 2 mm, in the longitudinal direction.

Regarding the aforementioned five kinds of the resin compositions, the melt viscosity ($\eta_{100}$) was measured under a plurality of temperature conditions and the moldability was evaluated by performing the injection molding in the aforementioned die MD.

First, the melt viscosities of the five kinds of the resin compositions were measured by changing the shear rate from 100 ($\sec^{-1}$) to 2500 ($\sec^{-1}$) under a plurality of temperature conditions, then approximate straight lines represented in formula (2) below were determined for the obtained measured results, and then the magnitudes of the negative slopes of the approximate straight lines "A" were determined.

$$\mathrm{Log}_{10}\eta = -A \cdot \log_{10} D + C \quad (2)$$

In the formula, "$\eta$" represents the melt viscosity (Pa·s), and "D" represents the shear rate. Further, "A" represents the slope of the approximate straight line, and "C" represents the intercept of the approximate straight line (i.e., y-axis intercept of the approximate straight line with x-axis as the shear rate and y-axis as the melt viscosity).

Figure 7:
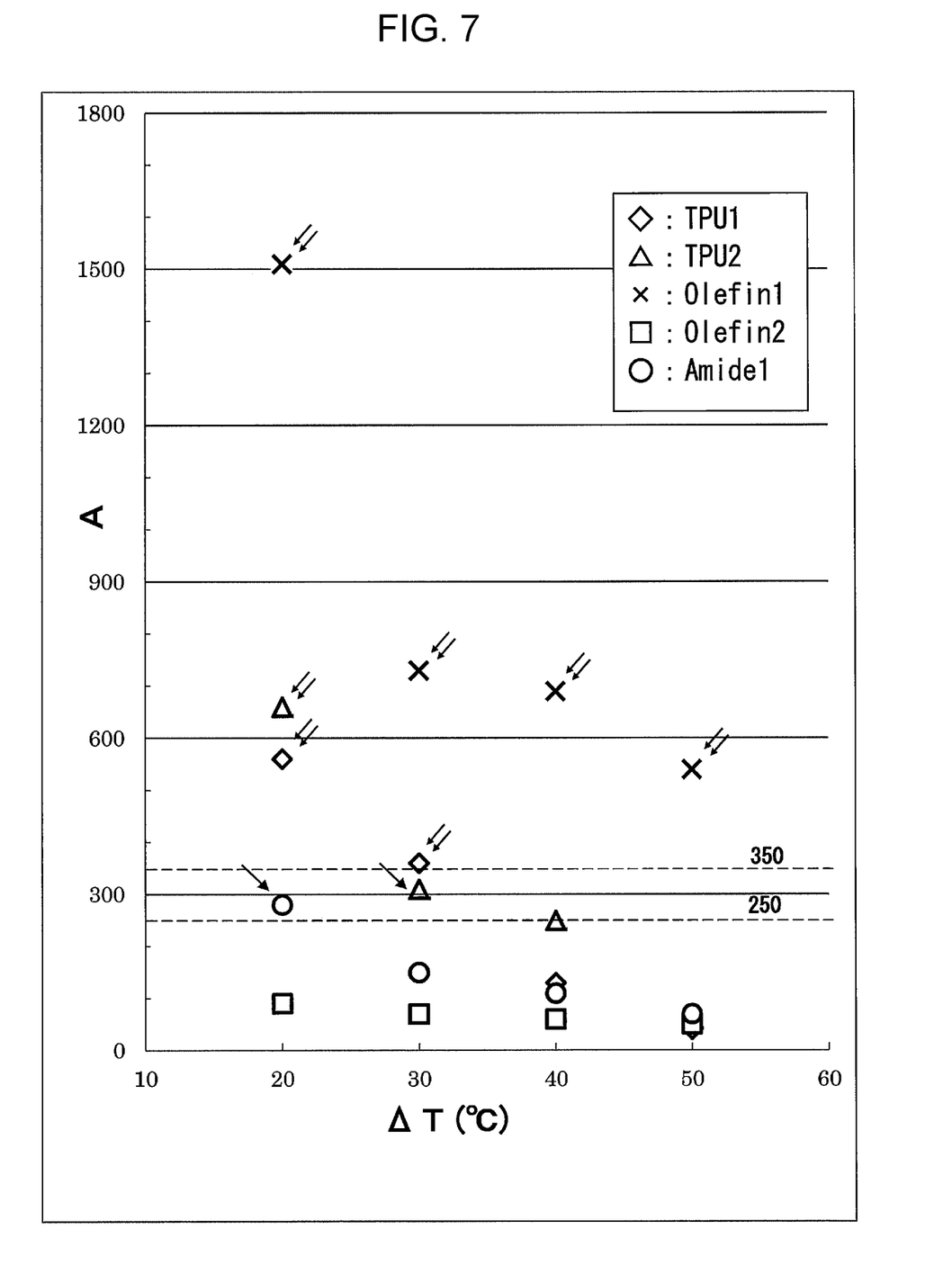
FIG. 7 is a graph showing the evaluation results in the embodiments (i.e., a graph showing the relationship between the change degree of the resin composition in the melt viscosity with the shear rate and the measured temperature)

The "thermal melting temperature" of each of the resin compositions was determined, the value (A) of the slope of formula (2) was determined at a temperature 20° C. to 50° C. higher than the "thermal melting temperature", and the relationship between the "difference (ΔT) between the thermal melting temperature and the measured temperature" and the "value (A)" was determined. The results are shown in FIG. 7. In FIG. 7, the line segment where "A=250" and the line segment where "A=350" are shown in broken lines, respectively.

Evaluation of the moldability of each of the resin compositions at each of the temperatures was made based on the following criteria.

(Adhesiveness Evaluation)

The adhesiveness between the substrate sheet and the injection molded article after the injection molding was evaluated by a peeling test, the results of which were determined in the manner mentioned below. The peeling test was performed by a method including peeling a tip end of the injection molded article in the injection direction from the substrate sheet using a nipper.

A: The injection molded article was not peeled off along the interface with the substrate sheet because the adhesiveness between the substrate sheet and the injection molded article was strong.

B: While the injection molded article partially remained on the substrate sheet after peeling off, the injection molded article was peeled off along the interface with the substrate sheet because the adhesiveness between the substrate sheet and the injection molded article was not sufficiently strong.

F: The adhesiveness between the substrate sheet and the injection molded article was not sufficient compared with even the adhesiveness determined as "B" above. The injection molded article was easily peeled off along the interface with the substrate sheet, and almost no injection molded article remained on the substrate sheet after peeling off was observed.

(Filling Properties)

Partial defects (material breakage) or the like of the injection molded article were visually evaluated, the results of which were determined in the manner mentioned below.

A: The resin composition reached over the area where the outsole parts of the shoe could be taken out.

B: The resin composition reached to a certain area, but it was not a sufficient area from which the outsole parts can be taken out.

F: The resin composition reached only the gate and its periphery, and almost no resin composition reached the portion to be used as any of the outsole parts.

(Overall Determination)

The evaluations of the adhesiveness and the filling properties were comprehensively evaluated, the results of which were determined in the manner mentioned below.

A: The evaluation results of the adhesiveness and the filling properties were both determined as A.

B: One of the adhesiveness and the filling properties was determined as A and the other was determined as B, or both were determined as B.

F: Either or both of the adhesiveness and the filling properties were determined as F.

The results of this overall determination are represented by arrows in FIG. 7. That is, the results are represented by giving a single arrow at an upper left position on each of the legends for the combination of the resin composition and the measured temperature determined as B in the overall determination, and giving two arrows at an upper right position of each of the legends for the combination of the resin composition and the measured temperature determined as F in the overall determination.

The results shown in FIG. 7 reveal that it is effective to use, as a material for forming the injection molded article, the resin compositions having a magnitude of the negative slope of the approximate straight line "A", which is determined by measuring the melt viscosity while changing the shear rate from 100 ($\sec^{-1}$) to 2500 ($\sec^{-1}$), being not more than 350. The results shown in FIG. 7 also reveal that it is particularly effective to use, as a material for forming the injection molded article, the resin compositions having a magnitude of the slope "A" being not more than 250.

Figure 8:
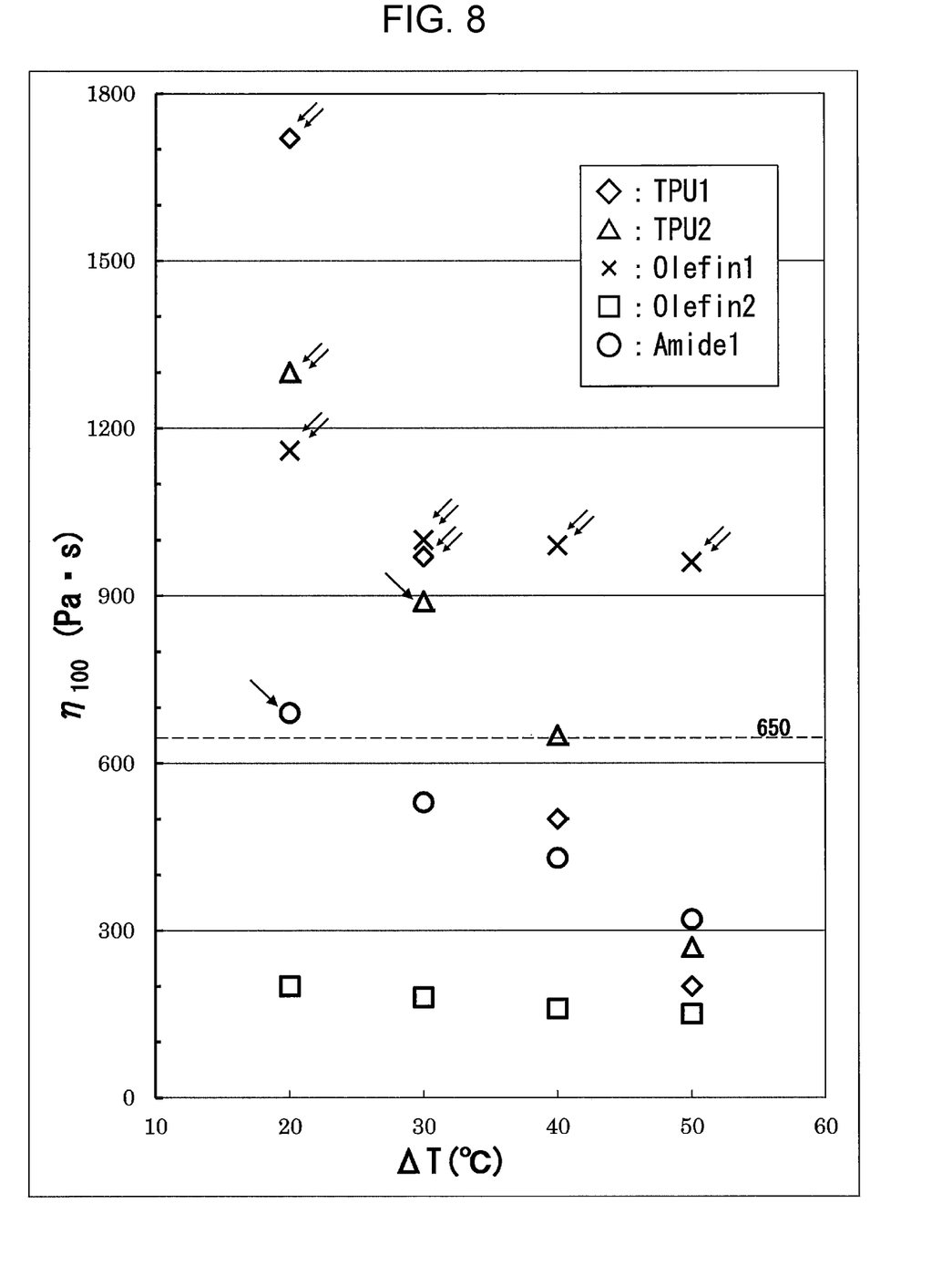
FIG. 8 is a graph showing the evaluation results in the embodiments (i.e., a graph showing the relationship between the melt viscosity of the resin composition and the measured temperature).

Next, the relationship between: the melt viscosity ($\eta_{100}$) of the resin composition measured at a temperature equal to or higher than the "thermal melting temperature" and at a shear rate of 100 ($\sec^{-1}$); and the "difference (ΔT) between the thermal melting temperature and the measured temperature" is shown in FIG. 8. In FIG. 8, the line segment where "$\eta_{100} \leq 650$" is shown by broken lines. The arrows added to the legends represent the same meanings as those in FIG. 7. The results shown in FIG. 8 reveal that it is effective to use, as a material for forming the injection molded article, the resin compositions having, when the thermal melting temperature of the resin composition is set to T (° C.), a melt viscosity ($\eta_{100}$) at the shear rate 100 ($\sec^{-1}$) in at least part of the temperature range of (T+0° C.) to (T+50° C.) being not less than 900 Pa·s. The results shown in FIG. 8 also reveal that it is particularly effective to use, as a material for forming the injection molded article, the resin composition having a melt viscosity ($v_{100}$) being not less than 650 Pa·s in any part of the temperature range in the aforementioned temperature range.

The aforementioned descriptions reveals that, according to the present disclosure, it is possible to obtain not only a sheet body in which the substrate sheet and the injection molded article are strongly adhered to each other, but also a sheet body that is suitable for a material for forming the outsole. Thus, it reveals that a shoe excellent in grip performance and long-term durability is provided by the present disclosure.

The outsole and shoe of this embodiments is as described above. However, the present disclosure is not limited to the above described embodiments, and the design can be appropriately modified within the scope intended by the present disclosure. The operational advantage of the present disclosure is also not limited to the foregoing embodiments.

The embodiments disclosed herein should be construed in all respects as illustrative but not limiting. The scope of the present disclosure is not indicated by the foregoing description but by the scope of the claims. Further, the scope of the present disclosure is intended to include all the modifications equivalent in the sense and the scope to the claims.

What is claimed is:

1. An outsole comprising:
at least one sheet body,
the sheet body comprising a substrate sheet and an injection molded article that is obtained by injection molding of a resin composition directly to the substrate sheet,
the injection molded article being fixed directly to the substrate sheet by injection molding,
the resin composition comprising a thermoplastic resin, and
the resin composition having, when a thermal melting temperature is set to T(° C.), a melt viscosity at a shear rate of at least 100 (sec$^{-1}$) in at least part of a temperature range of (T+0° C.) to (T+50° C.) satisfying formula (1) below $$\eta_{100} \leq 900 \text{ Pa·s} \quad (1);$$

wherein the injection molded article comprises a continuous body of said resin composition having a plurality of protruding portions extending toward a ground engaging surface and a plurality of connecting members of said resin composition each connecting adjacent ones of the protruding portions, and
wherein the resin composition is represented by an approximate straight line shown in formula (2) below according to a measurement result obtained by measuring the melt viscosity by changing the shear rate from 100 (sec$^{-1}$) to 2500 (sec$^{-1}$) at any temperature in the temperature range satisfying the formula (1) above $$\text{Log}_{10}\eta = -A \cdot \text{log}_{10}D + C \quad (2);$$

(wherein "$\eta$" represents the melt viscosity (Pa·s), "D" represents the shear rate, "A" represents a slope of the approximate straight line having a magnitude of more than 0 and not more than 350, and "C" represents an intercept of the approximate straight line).

2. The outsole according to claim 1, wherein
a flow direction of the resin composition in the injection molded article is a direction along a surface of the substrate sheet,
the plurality of connecting members of the injection molded article connecting adjacent ones of the protruding portions are alternately arranged in the flow direction, and
the continuous body has a cross-sectional shape such that a cross-sectional area of the plurality of connecting members in the flow direction of the resin composition is smaller than a cross-sectional area of the plurality of protruding portions.

3. The outsole according to claim 2, wherein the substrate sheet comprises a fiber sheet.

4. The outsole according to claim 3, wherein
the fiber sheet is a stretchable cloth that exhibits a highest stretchability in a certain direction, and
the continuous body extends along the certain direction in which the stretchable cloth exhibits the highest stretchability.

5. The outsole according to claim 3, wherein the injection molded article comprises:
a plurality of the continuous bodies aligned in parallel with each other;
covered portions in which a surface of the fiber sheet is covered by the plurality of the continuous bodies; and
exposed portions in which the surface of the fiber sheet is exposed, while not being covered by the plurality of the continuous bodies,
wherein the exposed portions extend respectively along the plurality of the continuous bodies.

6. The outsole according to claim 4, wherein the injection molded article comprises:
a plurality of the continuous bodies aligned in parallel with each other;
covered portions in which a surface of the fiber sheet is covered by the plurality of the continuous bodies; and
exposed portions in which the surface of the fiber sheet is exposed, while not being covered by the plurality of the continuous bodies,
wherein the exposed portions extend respectively along the plurality of the continuous bodies.

7. The outsole according to claim 3, wherein the fiber sheet is impregnated with a part of the resin composition that forms the injection molded article so that the injection molded article is fixed to the substrate sheet.

8. The outsole according to claim 4, wherein the fiber sheet is impregnated with a part of the resin composition that forms the injection molded article so that the injection molded article is fixed to the substrate sheet.

9. The outsole according to claim 5, wherein the fiber sheet is impregnated with a part of the resin composition that forms the injection molded article so that the injection molded article is fixed to the substrate sheet.

10. The outsole according to claim 6, wherein the fiber sheet is impregnated with a part of the resin composition that forms the injection molded article so that the injection molded article is fixed to the substrate sheet.

11. A shoe comprising the outsole according to claim 1.

* * * * *